US006985816B2

(12) United States Patent
Sorrells et al.

(10) Patent No.: US 6,985,816 B2

(45) Date of Patent: Jan. 10, 2006

(54) METHODS AND SYSTEMS FOR DETERMINING THE ORIENTATION OF NATURAL FRACTURES

(75) Inventors: Gordon G. Sorrells, Garland, TX (US); Norman R. Warpinski, Albuquerque, NM (US); Chris Wright, Mill Valley, CA (US); Eric Davis, El Cerrito, CA (US)

(73) Assignee: Pinnacle Technologies, Inc., San Francisco, CA (US)

( * ) Notice: Subject to any disclaimer, the term of this patent is extended or adjusted under 35 U.S.C. 154(b) by 0 days.

(21) Appl. No.: 10/674,937

(22) Filed: Sep. 30, 2003

(65) Prior Publication Data

US 2005/0060099 A1 Mar. 17, 2005

Related U.S. Application Data

(60) Provisional application No. 60/503,027, filed on Sep. 15, 2003.

(51) Int. Cl.
*G01V 1/28* (2006.01)

(52) U.S. Cl. .......................................................... 702/14

(58) Field of Classification Search ................... 702/12, 702/13, 14, 18; 367/73

See application file for complete search history.

(56) References Cited

U.S. PATENT DOCUMENTS

| | | | |
|---|---|---|---|
| 5,010,527 | A | 4/1991 | Mahrer |
| 5,377,104 | A | 12/1994 | Sorrells et al. |
| 5,574,218 | A | 11/1996 | Withers |
| 5,747,750 | A | 5/1998 | Bailey et al. |
| 5,771,170 | A | 6/1998 | Withers et al. |
| 5,774,419 | A | 6/1998 | Uhl et al. |
| 5,917,160 | A | 6/1999 | Bailey |
| 5,934,373 | A | 8/1999 | Warpinski et al. |
| 5,963,508 | A | 10/1999 | Withers |
| 5,996,726 | A | 12/1999 | Sorrells et al. |
| 6,049,508 | A | 4/2000 | Deflandre |

OTHER PUBLICATIONS

Kurt, T. Nihei, "Natural Fracture Characterization Using Passive Sesmic Illumination", Gas Research Institute, Jan. 2003, pp. ii–20.*

* cited by examiner

*Primary Examiner*—Donald McElheny, Jr.

(74) *Attorney, Agent, or Firm*—Haynes and Boone, L.L.P.; Priscilla L. Ferguson

(57) ABSTRACT

Methods, systems, and articles of manufacture consistent with the present invention provide for determining the orientation of natural fractures in the Earth resulting from hydraulic fracturing treatment. Data attribute information from a far-field point-source signal profile for a microseismic event is extracted in the time domain. An estimate of the orientation of the natural fracture is calculated in the time domain based on the extracted data attribute information.

22 Claims, 13 Drawing Sheets

METHODS AND SYSTEMS FOR DETERMINING THE ORIENTATION OF NATURAL FRACTURES

CROSS-REFERENCE TO RELATED APPLICATIONS

This Application claims the benefit of the filing date and priority to the following patent application, which is incorporated herein by reference to the extent permitted by law:

U.S. Provisional Application Ser. No. 60/503,027, entitled "MICROSEISMIC SOURCE PARAMETERS", filed Sep. 15, 2003.

BACKGROUND OF THE INVENTION

The present invention generally relates to the field of oil and gas production and, more particularly, to methods and systems for determining the orientation of natural fractures excited or reopened during hydraulic fracturing treatments.

Seismic data is used in many scientific fields to monitor underground events in subterranean rock formations. In order to investigate these underground events, microearthquakes, also known as microseisms, are detected and monitored. Like earthquakes, microseisms emit elastic waves—compressive ("P-waves") and shear ("S-waves"), but their spectral content peaks at much higher frequencies than those of earthquakes and generally fall within the acoustic frequency range of 100 Hz to more than 2000 Hz.

Standard microseismic analysis techniques locate the sources of the microseismic activity during hydraulic fracturing. In many gas fields, permeability is too low to effectively produce gas in economic quantities. Hydraulic fracturing addresses this problem by intentionally creating fractures in the gas fields that provide conduits to enhance gas flow. Fluid is pumped into wells at sufficient pressure to fracture the rock. The fluid also transports a propping agent (also known as "proppant") into the fracture. The proppant, usually sand or ceramic pellets, settles in the fractures and helps keep the fracture open when the fracturing operation ceases. Production of gas is accelerated as a result of improved capability for flow within the reservoir.

Microseismic detection is often utilized in conjunction with hydraulic fracturing techniques to map created fractures. A hydraulic fracture induces an increase in the formation stress proportional to the net fracturing pressure as well as an increase in pore pressure due to fracturing fluid leak off. Large tensile stresses are formed ahead of the crack tip, which creates large amounts of shear stress. Both mechanisms, pore pressure increase and formation stress increase, affect the stability of planes of weakness (such as natural fractures and bedding planes) surrounding the hydraulic fracture and, therefore, cause them to undergo shear slippage. It is these shear slippages that generate weak seismicity.

The sources of the microseisms are detected with multiple receivers (transducers) deployed on a wire line array in one or more offset well bores, which are displaced from the treatment well in which the fluid is pumped. These offset well bores are also known as monitor wells. With the receivers deployed in several wells, the microseism locations can be triangulated as is done in earthquake detection. Triangulation is accomplished by determining the arrival times of the various p- and s-waves, and using formation velocities to find the best-fit location of the microseisms. However, multiple offset wells are not usually available. With only a single nearby offset monitor well, a multi-level vertical array of receivers is used to locate the microseisms. Data is then transferred to the surface for subsequent processing to yield a map of the natural fracture geometry and azimuth.

The local recovery rate from a treated well is influenced by, among other things, the orientation of the natural fractures within or in close proximity to the zone of elevated pore pressures created during the stimulation by hydraulic fracturing. Thus, reliable information concerning the orientation of these natural fractures can be important in assessing the results of the treatment, as well as in assessing the well's future performance.

SUMMARY OF THE INVENTION

The methods of the present invention includes a method in a data processing system having a program for determining the orientation of a natural fracture in the Earth. The method comprises the steps of extracting, in the time-domain, data attribute information from a far-field point-source signal profile for a microseismic event, and calculating, in the time-domain, an estimate of the orientation of the natural fracture based on the extracted data attribute information.

In another aspect, the present invention includes a computer-readable medium containing instructions that cause a data processing system having a program to perform a method. The method comprises the steps of extracting, in the time-domain, a data attribute information from a far-field point-source signal profile for a microseismic event, and calculating, in the time-domain, an estimate of the orientation of the natural fracture based on the extracted data attribute information.

In yet another aspect, the present invention includes a data processing system comprising a memory comprising a program that extracts, in the time-domain, a data attribute information from a far-field point-source signal profile for a microseismic event, and calculates, in the time-domain, an estimate of the orientation of the natural fracture based on the extracted data attribute information; and a processing unit that runs the program.

In still another aspect of the present invention, a data processing system is provided. The data processing system comprises means for extracting, in the time-domain, a data attribute information from a far-field point-source signal profile for a microseismic event, and means for calculating, in the time-domain, an estimate of the orientation of the natural fracture based on the extracted data attribute information.

Other features of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE PRESENTLY PREFERRED EMBODIMENTS

Reference will now be made in detail to an implementation consistent with the present invention as illustrated in the accompanying drawings. Wherever possible, the same reference numbers will be used throughout the drawings and the following description to refer to the same or like parts.

Methods, systems, and articles of manufacture consistent with the present invention determine the orientation of seismically perceptible natural fractures activated by a hydraulic fracturing treatment. Data attributes of recorded seismograms are extracted, and then these data attributes are inverted to yield reliable estimates of the components of unit vectors specifying the orientations of the seismically perceptible set of natural fracture planes. The data attribute extraction and the subsequent inversion are performed in the time-domain.

Figure 1:
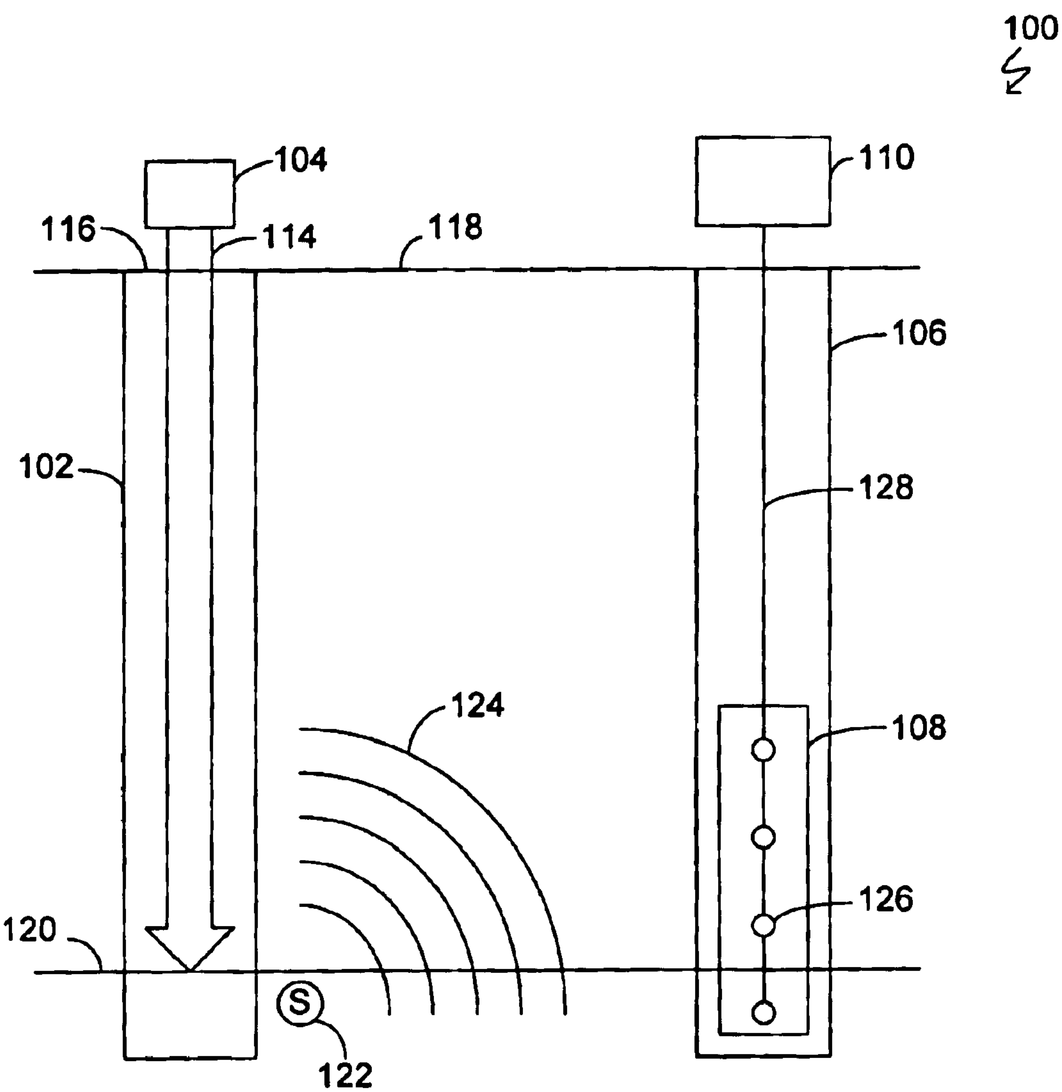
FIG. 1 shows a system for determining the orientation of natural fractures in accordance with methods and systems consistent with the present invention.

FIG. 1 depicts a schematic diagram of a system, generally designated by 100, for determining the orientation of natural fractures consistent with the present invention. As illustrated, the system generally comprises a treatment well 102 near which microseismic events are generated by a hydraulic fracture source 104, and an observation well 106 having a sensor array 108 therein for detecting the microseismic events. A data analysis system 110 records a seismogram profile of the events detected by sensor array 108 and determines the orientation of the seismically active natural fractures based on the seismogram profile.

Hydraulic fracture source 104 containing a pressurized fluid 114, such as water, is connected to treatment well 102. As shown, treatment well 102 extends below the Earth's surface, which is denoted by reference numeral 118. Beneath the Earth's surface 118, treatment well 102 extends into a fluid reservoir, the surface of which is denoted by reference numeral 120. In a manner that is known, the fluid within the reservoir is pressurized by hydraulic fracture source 104 to expand and apply pressure to the surrounding earthen walls. This pressure causes movement along natural fractures 122 resulting in seismic activity.

More specifically, as the movement occurs along the natural fractures 122, seismic waves 124 radiate outwardly from the fractures. Methods and systems consistent with the present invention detect these seismic waves 124 using sensor array 108 in observation well 106. Observation well 106 is laterally spaced from treatment well 102 and extends downward from the Earth's surface 118. It will be appreciated that more than one offset well bore may be used as the observation well, however, at least one offset well bore is required. Sensor array 108, which is vertically disposed within observation well 106, comprises one or more receiver units 126 that are spaced apart on a wire line array 128. The distance between individual receiver units 126 in a multi-unit array is selected to be sufficient to a low a measurable difference in the time of arrival of the seismic waves 124 that originate at natural fractures 122. Receiver units 126 contain tri-axial seismic receivers (transducers) such as geophones or accelerometers, e.g., three orthogonal geophones or accelerometers.

Figure 2:
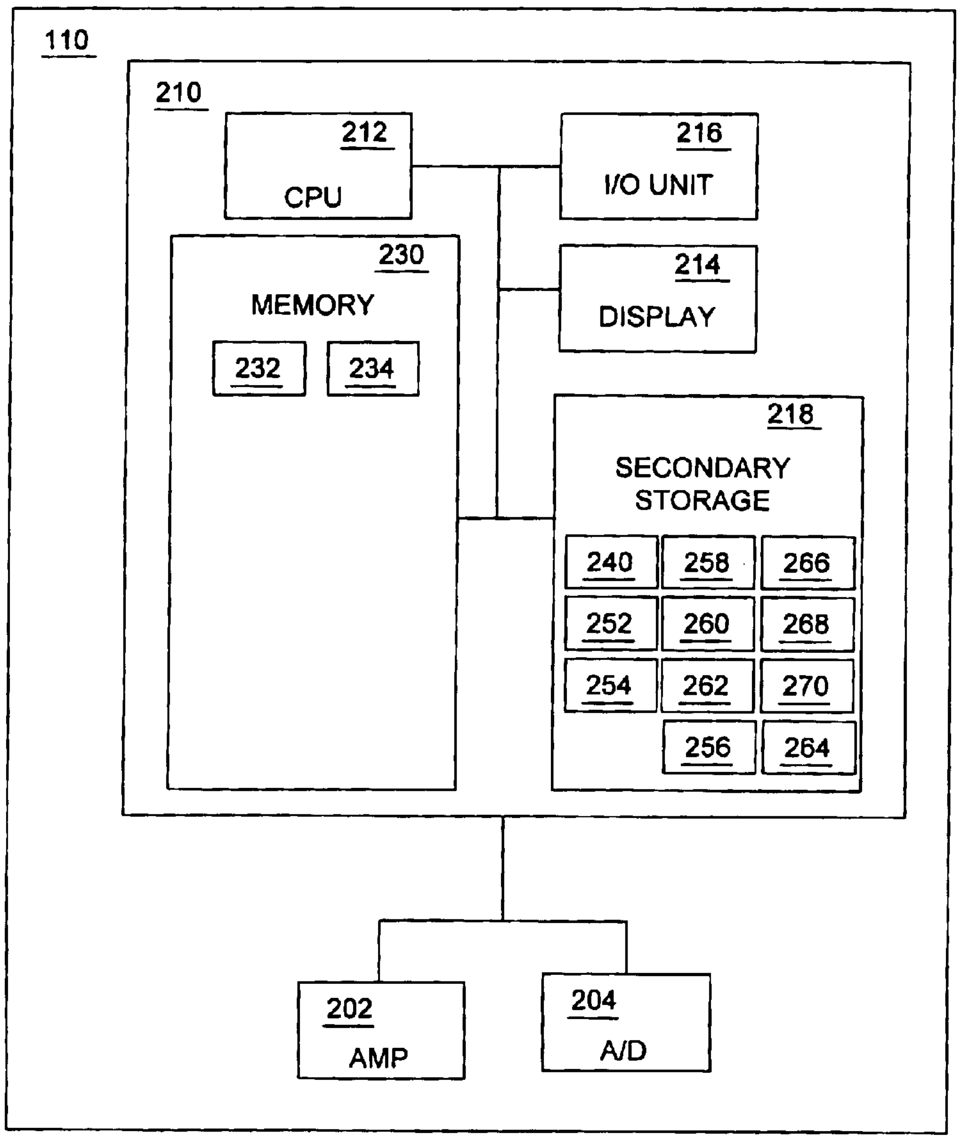
FIG. 2 shows a block diagram of the data acquisition system.

FIG. 2 depicts a data analysis system 110 suitable for use with methods and systems consistent with the present invention. In FIG. 2, data analysis system 110 comprises an amplifier 202, an analog-to-digital converter 204, and a data processing system 210. During the microseismic event resulting from the relative movement of the surfaces of natural fracture 122, seismic waves 124 impinging upon sensor array 108 are detected by the sensor array 108 and amplified by amplifier 202. An amplified signal is output from amplifier 202 and converted to a digital signal by analog-to-digital converter 204. Once the signal is in a digital form, it can be processed by the data processing system 210. Collected raw data may be archived in a memory 220 or a secondary storage 218 of data processing system 210. The raw data that is collected during microseismic event recording can be stored in a standard file format, such as a SEG2 format.

One having skill in the art will appreciate that the data acquisition and data collection functionality of data analysis system 110 can be included in a device separate from data processing system 210. The separate device would comprise amplifier 202, analog-to-digital converter 204, a processing unit, and a memory. The collected raw data would be stored on the separate device during data acquisition and can then be transferred to the data processing system 210 for processing.

The data processing system comprises a central processing unit (CPU) 212, a display device 214, an input/output (I/O) unit 216, secondary storage device 218, and memory 220. The services system may further comprise standard input devices such as a keyboard, a mouse or a speech processing means (each not illustrated).

Memory 220 contains a program 230 for determining the orientation of natural fractures. In an illustrative example, program 230 is implemented using MATLAB® software and comprises an attribute extraction block 232 and an inversion block 234. As will be described in more detail below, attribute extraction block 232 extracts, from the collected raw data, microseismic data attributes that satisfy far-field point-source constraints. Inversion block 234 performs a constrained non-linear inversion of the data attributes output from attribute extraction block 232 to yield estimates of the failure mode, failure plane orientation, and scalar moment for a single event. MATLAB is a United States registered trademark of The MathWorks, Inc. of Natwick, Mass. Although program 230 is implemented using MATLAB® software in the illustrative example, methods and systems consistent with the present invention are not limited thereto. Program 230 can be implemented in any programming language suitable for use with methods and systems consistent with the present invention.

One having skill in the art will appreciate that each functional block can itself be a stand-alone program and can reside in memory on a system other than data processing system 210. Program 230 and the functional blocks may comprise or may be included in one or more code sections containing instructions for performing their respective operations. While program 230 is described as being implemented as software, the present implementation may be implemented as a combination of hardware and software or hardware alone. Also, one having skill in the art will appreciate that program 230 may comprise or may be included in a data processing device, which may be a client or a server, communicating with data processing system 210.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 210 have been described, one having skill in the art will appreciate that a data processing system suitable for use with methods, systems, and articles of manufacture consistent with the present invention may contain additional or different components.

Data processing system 210 can itself also be implemented as a client-server data processing system. In that case, program 230 can be stored on the data processing system as a client, while some or all of the steps of the processing of the functional blocks described below can be carried out on a remote server, which is accessed by the client over a network. The remote server can comprise components similar to those described above with respect to the data processing system, such as a CPU, an I/O, a memory, a secondary storage, and a display device.

Figure 3:
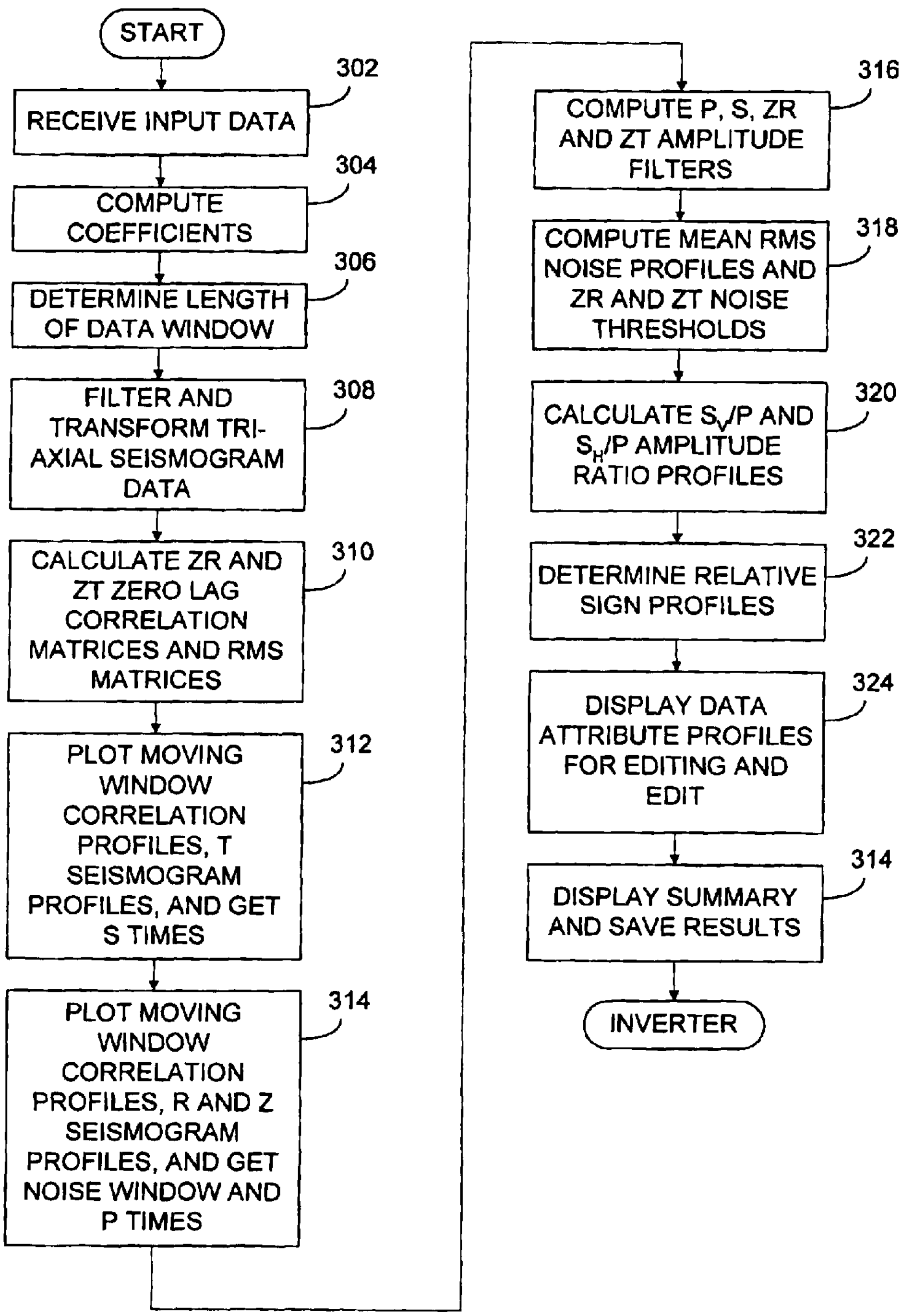
FIG. 3 shows a flow diagram illustrating the exemplary steps performed by the attribute extraction block.

FIG. 3 depicts a flow diagram illustrating the steps performed by attribute extraction block 232 of program 230. First, the attribute extraction block receives input data provided by a user entering the input data, which is used by attribute extraction block 232 in subsequent processing (step 302). The input data includes a file number and a file name of the tri-axial seismogram data file 240. As described above, tri-axial seismogram data is acquired and stored in a standard data format, such as the SEG2 format. Prior to initiating step 302, the user converts the data from the SEG2 format to the MATLAB® software.mtx format for use with program 230, which is implemented using MATLAB® software. If program 230 is implemented in another programming language, then the raw tri-axial seismogram data c an be converted to a format suitable for use with that programming language. Converting field of data files from one format to another is known in the art and will not be described in further detail.

The input data also includes project specific data received by attribute extraction block 232 and stored in an input data folder 252 for use during processing. The project specific data includes the following input data:

1. coordinates of the observation points referenced to the kb elevation of the observation well;

2. h1 sensor orientations referenced to North;

3. the microseismic source location file referenced to the observation well origin point; and 4. parameters of a band-pass filter that is used to isolate the far field, point source component of the microseismic signal.

The band-pass filter parameters include:

1. corner frequencies of the band-pass filter;

2. a pass band ripple magnitude in decibels; and 3. a minimum attenuation at the band stop edge frequencies in decibels.

After the input data is received in step 302, attribute extraction block 232 computes coefficients for the band-pass filter (step 304). In the illustrative example, attribute extraction block 232 uses the received filter parameters to calculate the coefficients of a zero phase Butterworth band-pass filter. Alternatively, another type of band-pass filter can be used.

Then, attribute extraction block 232 determines a length of a data window that is used to constrain data attribute calculations to selected time sections at the start of the P and S wave trains (step 306). The length of the data window is chosen to be an effective width of the apparent far field, point source seismic pulse and is determined as described below.

Suppose that $v_j(t)$ is the jth (j=1:3) Cartesian component of particle velocity for some phase of a given seismic event, when filtered by a linear operator whose impulse response is given by h(τ). Then, $$v_j(t) = \frac{d}{dt}\int u_j(\tau)h(t-\tau)d\tau$$

where $u_j(\tau)$ is the corresponding particle displacement component. It is known, however, that $$\int u_j(\tau)h(t-\tau)d\tau = \frac{1}{2\pi}\int H(f)U_j(f)\exp(i2\pi ft)df$$

where H(f) and $U_j(f)$ are the Fourier Transforms of h(τ),and $u_j(\tau)$, respectively.

To isolate the far field, point source component of the microseismic signal, H(f) is chosen to be the frequency response of a zero phase band-pass filter whose corner frequencies are chosen so that $U_j(f) \approx C_j$, where $C_j$ is a constant in the pass-band. Thus, for microseismic data attributes extraction it is safe to assume that $$v_j(t) \approx C_j \frac{d}{dt}\left(\frac{1}{2\pi}\int H(f)\exp(i2\pi ft)df\right) = C_j \frac{d}{dt}h(t)$$

In other words, the signal phase time series that is used for estimating data attributes is expected to be approximately proportional to the derivative of the filter impulse response function with respect to time. Recognition of this property eliminates the need for arbitrarily choosing a separate data window for each phase component at each station. Instead, a phase arrival time at each station and the length of the data window are specified. The data window length is interactively determined by computing and plotting the derivative of the impulse response function of the band-pass filter identified in step 304.

Figure 4:
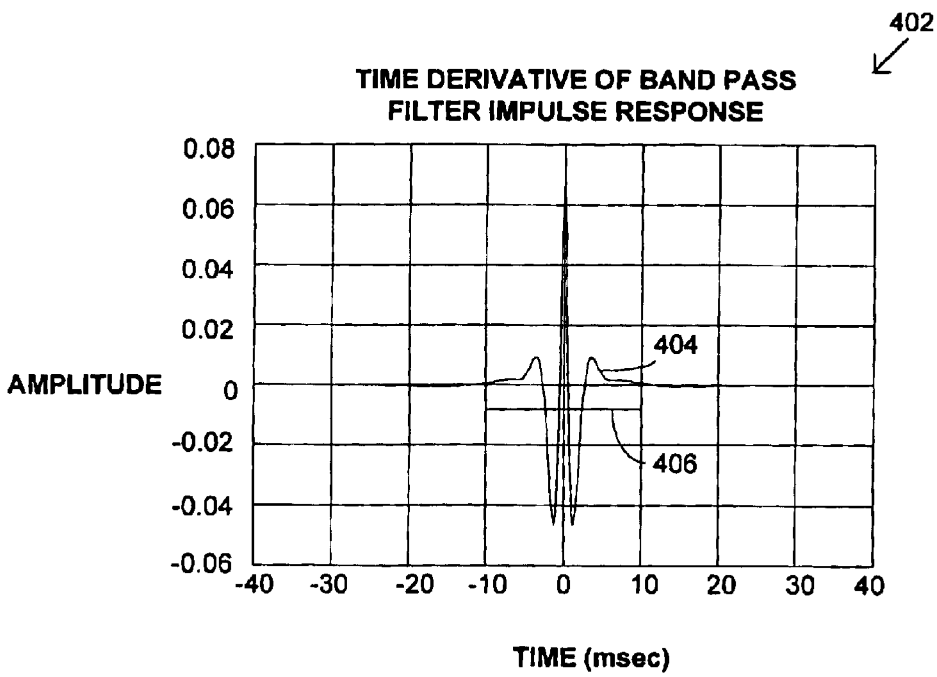
FIG. 4 shows an illustrative data window length display screen.

FIG. 4 depicts an illustrative sample display screen 402 output by attribute extraction block 232 for determining the length of the window. The derivative 404 of the impulse response of a sample zero-phase 2-pole Butterworth filter with nominal corner frequencies of 50 and 250 hertz is shown. Reference numeral 406 indicates the interactively selected length of the data window, which is received as input from the user. The user enters the length of the window, for example, in milliseconds or number of samples. In the illustrated example, the window has a length of about 20 msec.

Referring back to FIG. 3, attribute extraction program 232 then filters and transforms the tri-axial seismogram data (step 308). In this step, attribute extraction program 232 applies the band-pass filter to the tri-axial seismogram data recorded at each sensor in the observation well array. The difference between the h1 axis bearing at each sensor and the source bearing is then calculated by attribute extraction program 232 and used to rotate the horizontal axes to orientations parallel and perpendicular to the horizontal component of the P wave particle motion vector. These are referred to as the R and T seismograms. The direction from the source to the observation well array is chosen as the positive direction of the R axis. The positive direction of the T axis is 90-degrees counter-clockwise from the positive R axis. The R and T seismograms, as well as the corresponding vertical seismogram (Z), are then saved in three separate event specific data matrices. The procedures outlined above in step 308 are then repeated until all seismograms recorded at all sensors for the selected event have been filtered, rotated and saved in an appropriate data matrix. The matrices are saved to the memory, however, they may alternatively be saved to another location, such as the secondary storage device.

After filtering and transforming the tri-axial seismogram data in step 308, attribute extraction program 232 calculates ZR and ZT moving window zero lag correlation matrices and Z, R, and T moving window root-mean-square (RMS) matrices (step 310). The ZR and ZT moving window zero lag correlation matrices are computed by attribute extraction block 232 to aid in signal phase identification, timing and data attributes editing, as well as to contribute to an estimation of the Sv/Sh sign profile. The relationship described below is used to calculate the moving window zero lag correlation matrices Suppose that X(m,n) and Y(m,n) are (MxN) data matrices. If $C_{xy}(k,n)$ is the moving window zero lag correlation coefficient relating X and Y, then:

$$C_{xy}(k,n) = \frac{1}{W+1}\sum_{m=k-\frac{W}{2}}^{m=k+\frac{W}{2}} X(m,n)Y(m,n) \qquad k = \frac{W}{2}+1 \ \ldots \ M-W$$

where W is the moving window length.

The Z, R, and T moving window RMS traces are calculated to support supplemental background noise studies and data attributes editing functions. If $S_x(k,n)$ is the moving window RMS trace of X(m,n), then $$S_x(k,n) = \left(\frac{1}{W}\sum_{m=k-\frac{W}{2}}^{k+\frac{W}{2}} (X(m,n)-\overline{X}_k(n))^2\right)^{\frac{1}{2}} \qquad k = \frac{W}{2}+1 \ \ldots \ M-W$$

where $$\overline{X}_k(n) = \frac{1}{W+1}\sum_{m=k-\frac{W}{2}}^{m=k+\frac{W}{2}} X(m,n) \qquad k = \frac{W}{2}+1 \ \ldots \ M-W$$

Figure 5A:
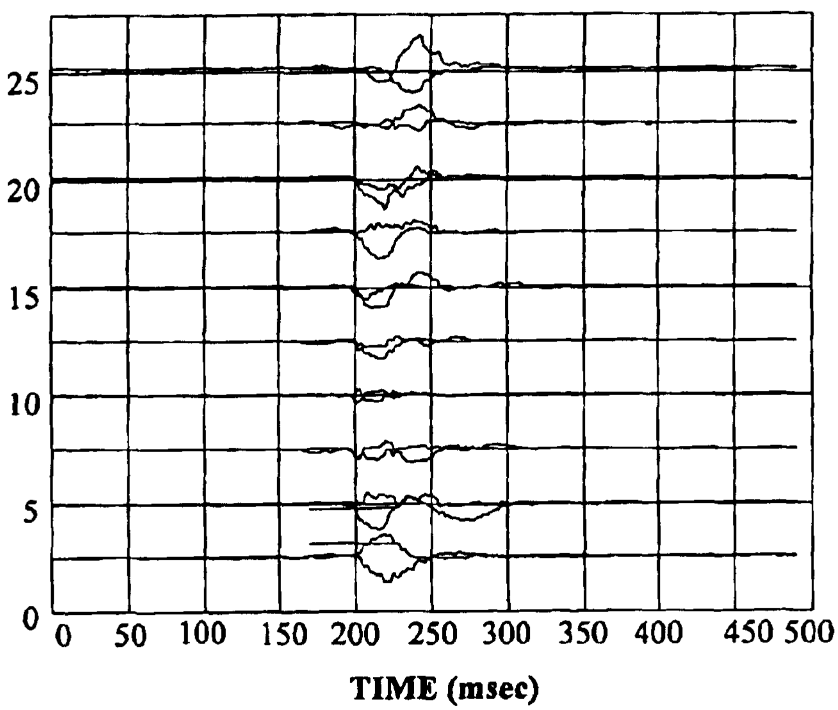
FIGS. 5A–5C show illustrative S timing screen displays.
Figure 5B:
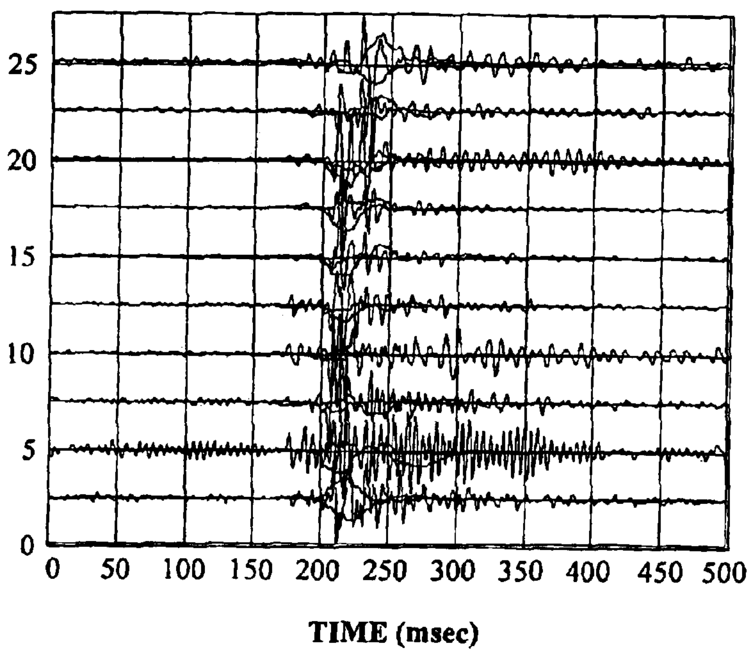
Figure 5C:
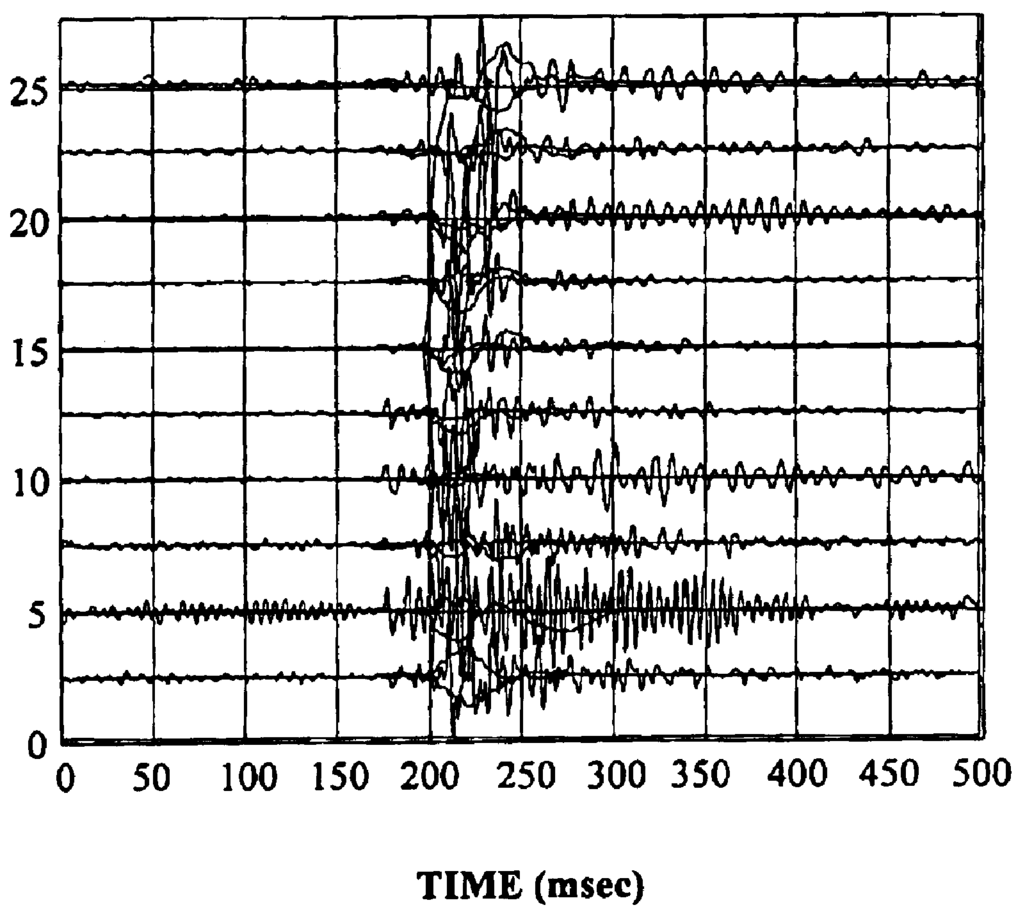

Then, attribute extraction block 232 plots the moving window correlation profiles, the T seismogram profiles, and the user selects the S arrival times (step 312). The sequence of operations that comprise this step is graphically depicted in FIGS. 5A–5C. As shown in FIGS. 5A–5C, attribute extraction block 232 plots the columns of the ZT, ZR and T data matrices in an overlying profiles format to aid the user in identifying the relative S arrival times for the selected microseismic event. Attribute extraction block 232 scales the columns of the ZR and ZT matrices to their maximum values and plots the data as a function of time, in an overlying profile format, as shown in FIG. 5A.

The similarly scaled T seismogram profile is then superimposed by the attribute extraction block 232 on the correlation profiles, as shown in FIG. 5B. The user is prompted to pick the S arrival times. Attribute extraction block 232 then calculates the corresponding data windows profile and superimposes it on the existing profiles, as shown in FIG. 5C. Since the S arrival times were already chosen to calculate the event location, the previously chosen times could be used by attribute extraction block 232 without any user interaction. Arrival times are those of the direct wave. In some situations, indirect waves, commonly called head waves, may arrive before the direct wave.

Figure 6A:
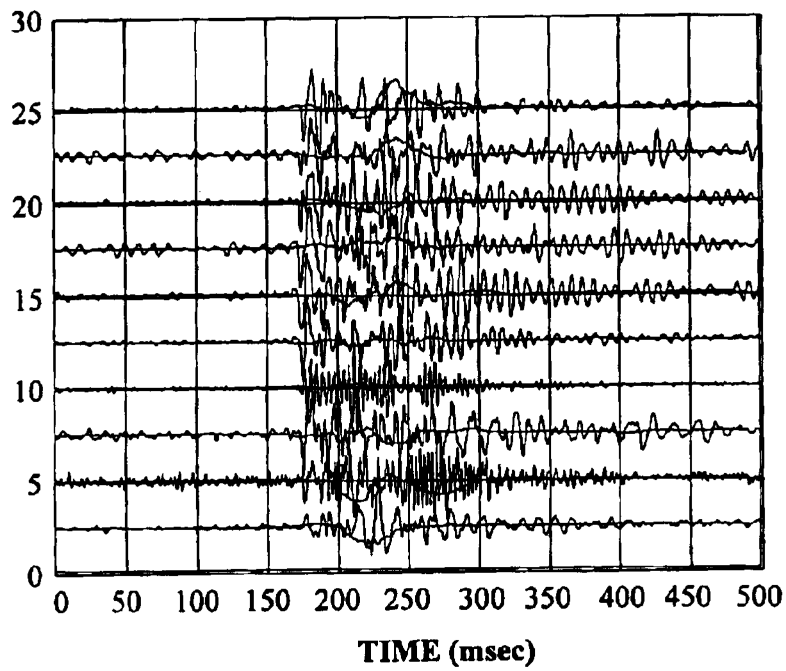
FIGS. 6A–6B show illustrative P timing screen displays.

After completing step 312, attribute extraction block 232 plots the moving window correlation profiles, R and Z seismogram profiles in a separate display and receives selected noise window and P times choices from the user (step 314) or, as with the S wave arrival times, from a separate software program. The sequence of operations that comprise this step is graphically depicted in FIGS. 6A–6B. First, attribute extraction block 232 plots the columns of the ZT, ZR, R and Z data matrices in an overlying profiles format to aid the user in the choice of a noise data window and the identification of the relative P arrival times for the selected microseismic event. The columns of the R matrix are scaled to their maximum values and plotted as a vertical profile and as a function of time. The ZR profile is superimposed on the R profile. Attribute extraction block 232 permits the user to select the start and end times of the noise window, as shown in FIG. 6A. This function can be automated so as not to require user input. In the illustrative example, the user selects a start time near the beginning of the record and an end time slightly before the P start time.

Figure 6B:
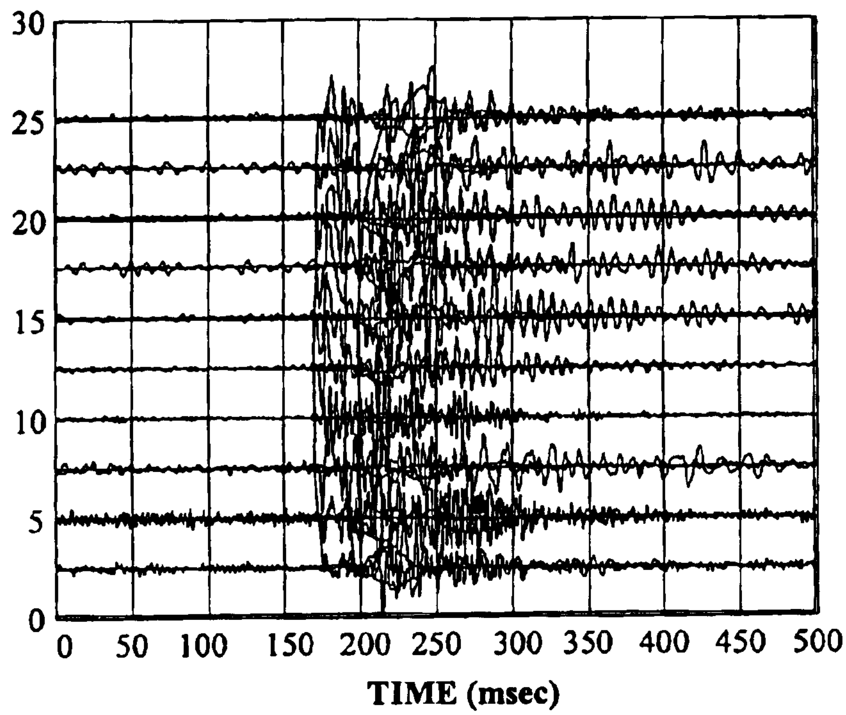

Attribute extraction block 232 then enables the plot function. The Z and ZT profiles and the S data window profile are superimposed on the previously plotted data. The user is then prompted to pick the P relative arrival times. Attribute extraction block 232 then calculates the P data window profile and superimposes it on the existing profiles, as shown in FIG. 6B.

Attribute extraction block 232 then computes the P, Sv, Sh, ZR, and ZT amplitude profiles (step 316). In this step, first, attribute extraction block 232 calculates the P, Sv, and Sh RMS amplitudes in the noise data windows defined in step 314. The noise windows are tapered to minimize edge effects by multiplying them with a Hanning window. The total P and Sv RMS amplitudes are calculated by computing the square root of the sum of the squares of the Z and R RMS amplitudes in the P and S data windows. The amplitude measurements are then converted to decibels and stored in the memory. The ZR amplitudes are then summed in the P windows and the ZR and ZT amplitudes are summed in the S windows to provide the basis for relative sign detection.

Then, attribute extraction block 232 computes mean RMS noise profiles and ZR and ZT noise thresholds (step 318). The mean RMS noise profiles are calculated within the noise window limited columns of the Z, R, and T matrices computed in step 310. The results of the calculations are converted to decibels and stored in the memory.

The ZR and ZT noise threshold profiles are then calculated by the attribute extraction block 232 for a user selected probability level for each point in the profiles.

After calculating the ZR and ZT noise profiles in step 318, attribute extraction block 232 calculates Sv/P, Sv/Sh, Sh/P amplitude ratio profiles (step 320). The amplitude ratio profiles are calculated in decibels.

Then, attribute extraction block 232 determines the relative signs of the ZR profile in the P window and the ZR and ZT profiles in the S window (step 322). If the profile trace exceeds its respective noise threshold in a user selected fraction of its data window, its relative sign is considered to be the sign of the summed trace in the data window. A value of +1 is assigned to the component if the relative sign is positive. A value of −1 is assigned if the relative sign is negative. If the trace section in the data window does not meet the user selected constraint, the component is assigned a value of 0.

Figure 7:
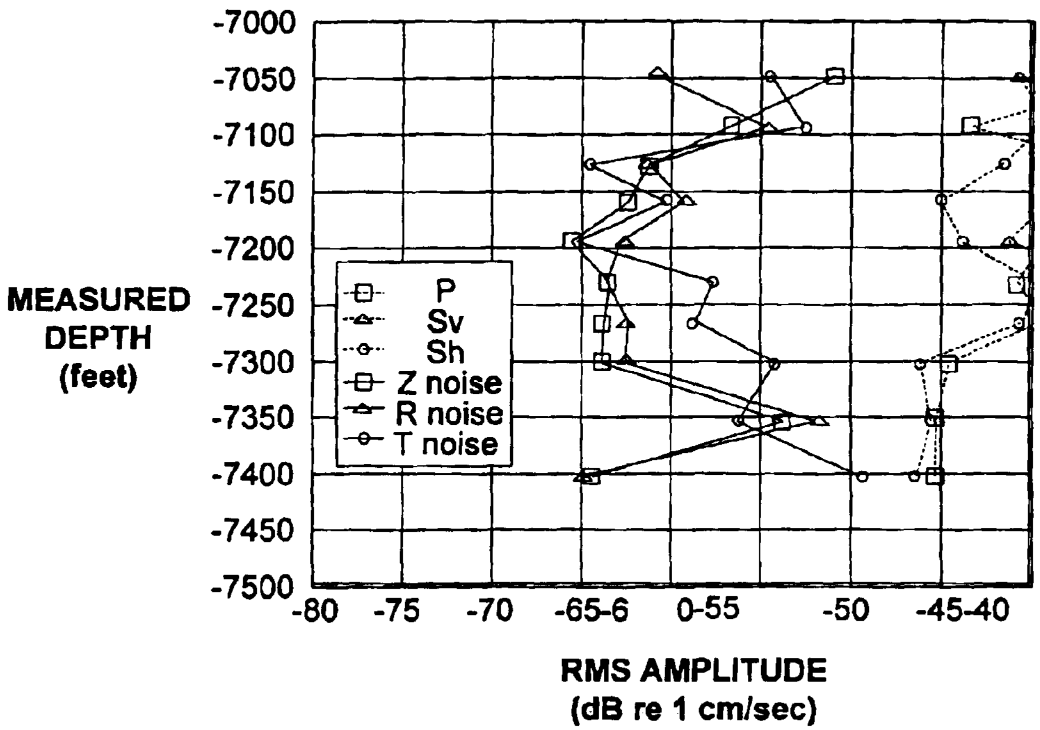
FIG. 7 shows an illustrative data edit screen display.
Figure 8:
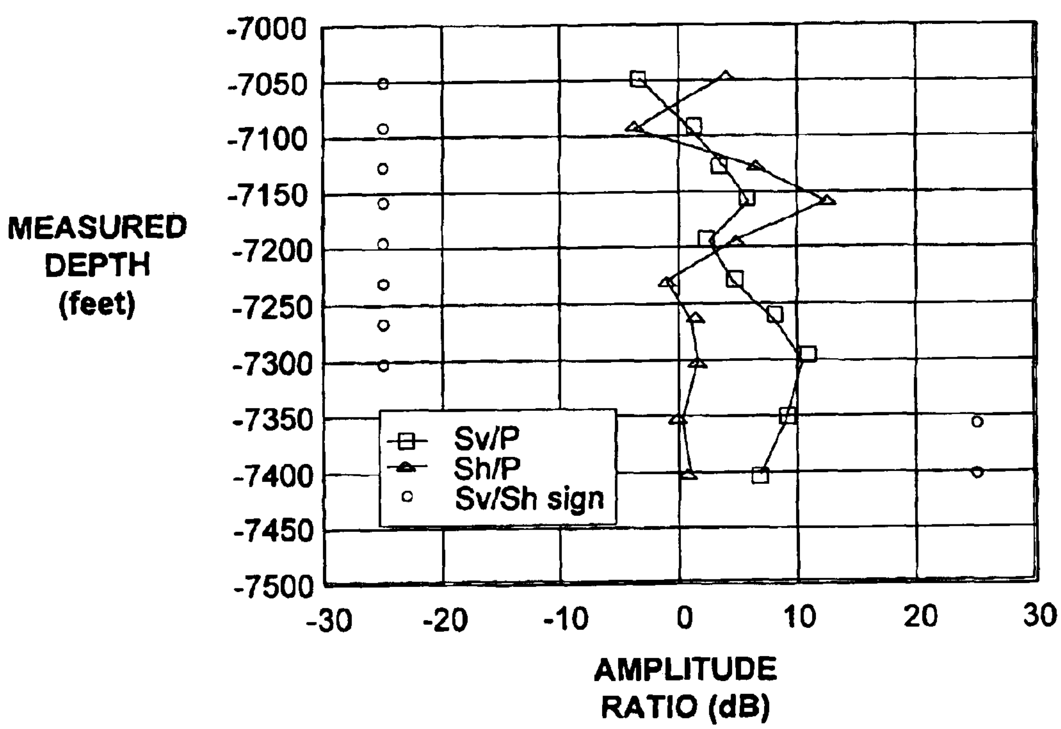
FIG. 8 shows another illustrative data edit screen display.

At this stage in the program steps, the data attribute profiles have been created and could be used by the inversion block 234 for further processing. Attribute extraction block 232, however, initially allows the user to review and edit the data attribute profiles (step 324). In this step, attribute extraction block 232 displays a first graph that compares the RMS noise and signal amplitude profiles and a second graph that displays the data attribute profiles. Illustrative examples of the first graph and the second graph are shown in FIGS. 7 and 8, respectively.

After completing these plots, attribute extraction block 232 receives user input to edit the data attribute profiles. Via the MATLAB® program command screen, the user can delete the data attributes characterizing certain points in the profile. Alternatively, the user can enter input indicating that no station is to be dropped.

After the data attribute profiles are edited in step 324, attribute extraction block 232 displays a summary of the data attributes for the user and saves the results to a folder on the secondary storage device (step 326). Also, the summary matrix, the data window length (sample points), the sample rate, the band pass filter corner frequencies, and the drop stations edit vector are saved in an attributes extraction file 254.

Figure 9:
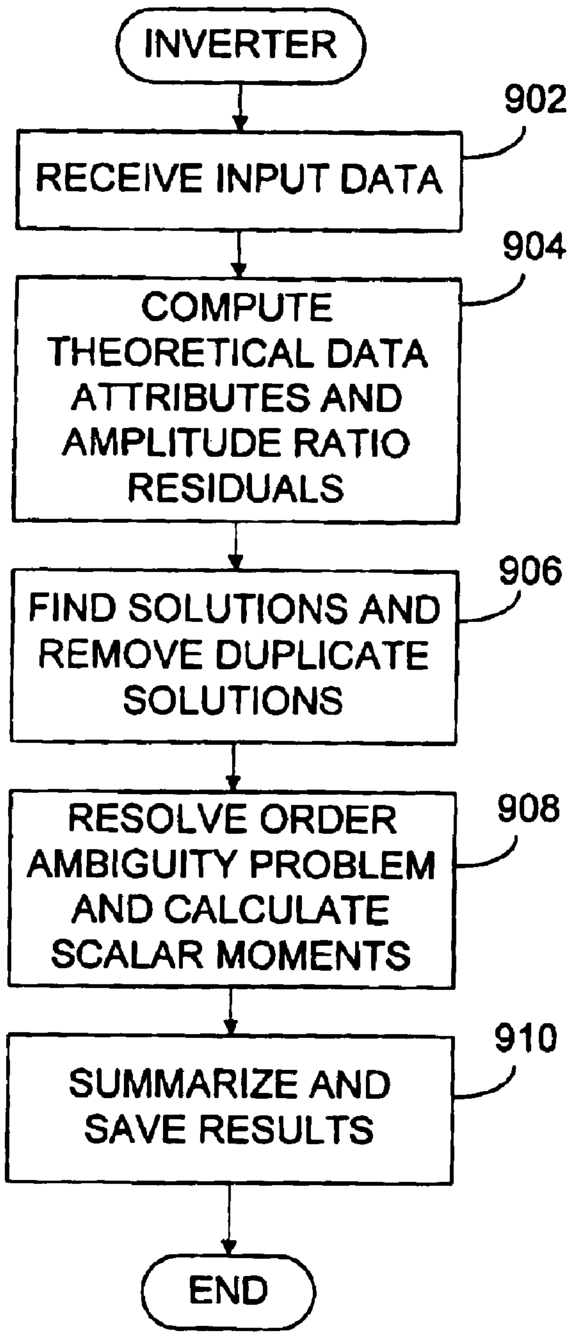
FIG. 9 shows a flow diagram illustrating the exemplary steps performed by the inverter block.

Upon completion of processing by the attribute extraction block 232, program 230 initiates execution of inverter block 234, which performs a constrained non-linear inversion of the data attributes provided by attribute extraction block 232 to yield estimates of the failure mode, failure plane orientation and scalar moment of a selected microseismic event. FIG. 9 depicts a flow diagram illustrating the exemplary steps performed by inverter block 234. First, inverter program 234 receives data input from the user for further processing (step 902). The data input includes an event name of the event to be analyzed, an event file number, and the event data attributes file (which was computed and saved by attribute extraction block 232), an event take-off angle folder 256, and a take-off angle mode option. The event take-off angle folder contains a velocity model, the source location, and the sensor depths. If the take-off angle folder has been created, the take-off angle mode option is inputted as a value of zero. While if the take-off angle folder has not been created, the take-off angle mode option is set to a value of 1.

Further, the data inputs include a solution grid folder 258, an upper residual range limit, an upper dilatancy ratio range limit, a project data folder 260, and a solution means values folder 262. The solution grid folder contains the angle of the normal to the seismically determined hydraulic fracture bearing as measured counter-clockwise from the positive east axis of a Cartesian ZNE coordinate system. The number of calculation points, <m>, is also specified, with the default value of <m> being 23. It returns a matrix of $m^2$ unit vectors, all possible inner products of the unit vector and the hydraulic fracture bearing normal.

The default lower residual range limit is 0. The user specifies the upper limit, with the default value being 0.3.

The project data folder contains the tri-axial sensor depths, the h1 axis orientations, and the microseismic source locations.

The solution mean values folder contains the mean values of the solutions previously generated by inverter program 234.

After the input data is received by inverter block 234 in step 902, inverter block 234 computes theoretical data attributes and amplitude ratios and residuals (step 904). In this processing step, inverter block 234 first calculates the take-off vector matrices These matrices contain the three Cartesian components of three mutually orthogonal base vectors, which are identified as r, p, and q for each station. The r(j,:) row vector contains the ENZ components of the unit vector tangent to the ray path from the estimated source location to the $j^{th}$ station in the edited observation point array, with the point of tangency being the ray path source point. The p(j,:) row vector lies in the plane formed by the edited observation point array and the source location, and is orthogonal to the r(j,:) row vector. The q(j,:) row vector is orthogonal to the plane containing the r(j,:) and p(j,:) row vectors. Further, the directional senses of r, p, and q are chosen so they form the base vectors of a right-handed coordinate system with r positive in the direction of the bearing from the source to the observation point.

After calculating the take-off vector matrices, inverter block 234 calculates P, Sv and Sh amplitude profiles and residuals. To do this, inverter block 234 uses a far field, point source approximation to calculate the theoretical P, Sv and Sh amplitude profiles. If n is the matrix of unit vectors loaded as the solution grid, and l is an identical matrix, then n is identified by inverter block 234 as the matrix of unit normal components of possible failure planes, while l is identified as the matrix containing the slip vector components. All possible combinations of the row vectors of n and l are used, together with the r, p, and q matrices described above, to calculate normalized P, Sv, and Sh profiles. The relevant equations used for these calculations are shown below.

If $u_p$ is the normalized P displacement, then $$u_p = \frac{1}{k^2}[(k^2-2)(n\circ l)+2(n\circ r)(l\circ r)]$$

Similarly, if $u_{Sv}$ is the normalized Sv displacement, then $$u_{Sv}=k[(n\circ p)(l\circ r)+(n\circ r)(l\circ p)]$$

and if $u_{Sh}$ is the normalized Sh displacement, then $$u_{Sh}=k[(n\circ q)(l\circ r)+(n\circ r)(l\circ q)]$$

where k is the P/S velocity ratio in the formation containing the source, and the operator ( . . . ∘ . . . ) indicates the inner product of two vectors.

The absolute values of the theoretical amplitude ratio profiles are computed from these equations and expressed in decibel units. The corresponding Sv/Sh sign profiles are calculated by taking the signs of the $u_{Sv}/u_{Sh}$ ratios.

The mean differences between the observed and predicted profiles are calculated for every possible solution and the average of the amplitude ratio mean values is used to characterize the residual for a particular solution.

The calculations performed in step 904 result in a universe containing $m^4$ possible solutions. In step 906, inverter block 234 applies three sequentially applied constraints to search for the "most likely" solution(s). By applying the dilatancy constraint, this restricts the search to a subset of weakly dilatant shear failures. Application of the residual constraint to this subset finds those solutions whose amplitude ratio profiles closely approximate the experimentally determined amplitude ratio profiles. Application of the Sv/Sh sign profile constraint eliminates so-called "image" solutions from the remainder of possible solutions. "Image" solutions appear in the solution population because the polarity of the Sv/P and Sh/P amplitude ratios is difficult to determine in practice. It is therefore ignored in the calculation of the experimental and theoretical amplitude ratio profiles. The polarity of the Sv/Sh ratio is easier to determine and is therefore used to remedy this situation.

The resultant "constrained" subset contains an even number of possible solutions. This phenomenon occurs because the calculations of theoretical P, Sv and Sh amplitudes, using the equations found in step 904, are unchanged by the exchange in the positions of n and l. Consequently, duplicate solutions appear in the "constrained" subset. The duplicate solutions are found by calculating the vector product of the unit vector pairs characterizing each solution; then calculating the inner products of all possible solution vector products to find inversely aligned pairs. The final "constrained" solution subset is then created by the retention of one element from each inversely aligned pair and its identification with a particular pair of solution vectors.

Figure 10:
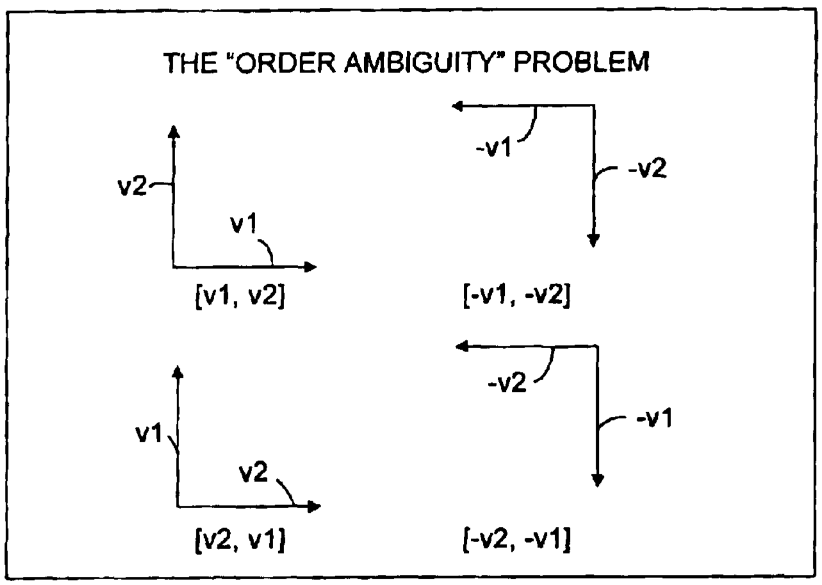
FIG. 10 shows a block diagram illustrating an "order ambiguity" problem.

After finding the solutions in step 906, inverter block 236 resolves the order ambiguity problem and calculates scalar moments (step 908). The "order ambiguity" problem is graphically depicted in FIG. 10. Inverter block 234 returns unordered pairs of vectors, that at this stage in the processing, are identified for example as [v1,v2]. At this point in the source mechanics estimation process, there are four possible configurations of the unordered pair of vectors returned by inverter block 234 that are equally likely solutions. The two possible solutions in the first column of FIG. 10 reflect that n and 1 can be exchanged in the theoretical expressions for P and S without changing the respective magnitudes or polarities of these signal components. This is the "systemic order ambiguity" and is inherent to all seismic source mechanism estimation methods. The other two solutions reflect that only the readily estimated Sv/Sh ratio polarities are used to constrain the solution search. In step 908, inverter block 234 rearranges the unordered pairs, [v1,v2], into the ordered pairs [n,l]. The following assumptions are made to meet this objective:

- the microseismic failure can, to a first order, be considered two-dimensional;
- the seismically determined hydraulic fracture azimuth is approximately parallel to either the maximum or the intermediate principal stress azimuth; and
- the vertical principal stress is not the minimum principal stress.

A method for the partial resolution of the order ambiguity problem is implied by these assumptions. The two-dimensional assumption implies that the failure planes of the microseismic events will be optimally aligned with respect to the local stress regime induced by the hydraulic fracturing treatment. The remaining two assumptions specify the expected alignment of the principal stress axes. A remaining issue is to identify the failure mode, since it will determine the relative magnitudes of the effective principal stresses. Inverter block 234 implements the steps described below to identify the failure mode.

Suppose that $\phi_{j1}$ and $\phi_{j2}$ are the bearing angles for the [v1,v2] vector pair returned for by the inversion code for the $j^{th}$ solution in the "constrained" population and $\phi_S$ is bearing angle of the normal to the seismically determined hydraulic fracture azimuth, then $$\Delta\phi_{jk}=\phi_{jk}-\phi_S \quad k=1,2$$

where $\Delta\phi_0$ is a reference difference. The reference difference is currently set at 44°. A simple test that takes the form:

$$|\Delta\phi_{jk}|\leqq\Delta\phi_0 \quad k=1,2$$

is then implemented.

There are three possible outcomes for this test:

1. One unit vector satisfies the constraint. This outcome implies a strike-slip failure mode and the seismically determined hydraulic fracture azimuth is approximately parallel to the maximum principal stress direction. The vector that satisfies this condition is chosen to be the unit normal to the microseismic failure plane. The order ambiguity is resolved in this particular case.

2. Both unit vectors satisfy the constraint. This outcome implies a normal fault failure mode and the seismically determined hydraulic fracture azimuth is approximately parallel to the intermediate principal stress direction. In this case, one additional constraint is required to resolve the order ambiguity. The additional constraint may be stated as follows:

If $v_{j1}$ and $v_{j2}$ are the two unit vectors returned by inverter block 234 for solution j and $\theta_{j1}$ and $\theta_{j2}$ are their respective dip angles and $n_j$ and $l_j$ are the unit normal and slip vectors for solution j then:

$$\lfloor n_j, l_j\rfloor=\lfloor v_{jp}, v_{jq}\rfloor \text{if}$$

$$45°\leqq\theta_{jp}\leqq 90° \text{ and}$$

$$\theta_{jq}>90°$$

Otherwise, if $$0°\leqq\theta_{jp}<45° \text{ and}$$

$$\theta_{jq}\geqq 90°$$

$$[n_j,l_j]=[-v_{jq},-v_{jp}]$$

3. Neither unit vector satisfies the constraint. This outcome implies the solution fails to satisfy the assumptions listed above. In this case, the failure mechanism and the stress regime cannot be identified on the basis of the microseismic data alone. Additional independent constraints are required by inverter block 234 to resolve the order ambiguity.

After resolving the order ambiguity problem, inverter block 234 calculates scalar moments in step 908. While estimates of the scalar moment of seismic events are traditionally derived from measurements of signal displacements in the frequency domain, methods and systems consistent with the present invention use a time domain estimator, which is more suitable for the microseismic data processing strategy. Given that the displacement spectrum of the P wave, $D_p(f)$, approaches a constant value, $C_p$, in some frequency range, $0<f<f_p$, it is readily shown with the aid of Parsevals Theorem that if $\langle\dot{u}_p\rangle$ is the variance of the band-pass filtered P waveform in some data window of length, L, then:

$$\langle\dot{u}_p\rangle=\frac{4\pi^2C_p^2}{Lf_s}\int_{lc}^{hc}f^2|H(f)|^2|D_p|^2\,df$$

where $f_s$ is the sampling frequency and lc and hc are the corner frequencies of the band-pass filter whose frequency response is H (f), and $$C_p = \frac{M_o I_p}{4\pi\rho v_p^3 R}$$

and $M_o$=Seismic moment $I_p$=P Radiation pattern

ρ=Density of the formation containing the source $v_\rho$=P wave velocity in the formation containing the source R=Distance from source to observation point Since $D_p(f)\to 1$ for $f<f_p$ and $lc<f_p$ and $|H(f)|^2\approx 1$; $lc<f<hc$ it follows that $$\langle \dot{u}_p \rangle \approx \frac{4\pi^2 C_p^2}{Lf_s}\int_{lc}^{hc} f^2\, df$$

Then if $\dot{P}_{RMS}$ is the RMS P particle velocity that is calculated by attribute extraction block 232, $$\dot{P}_{\mathrm{RMS}} = \sqrt{\langle \dot{u}_p \rangle} \approx 2\pi C_p \left(\frac{hc^3 - lc^3}{3Lf_s}\right)^{\frac{1}{2}}$$

and from the definition of $C_p$ given above $$M_o \approx \frac{2\dot{P}_{\mathrm{RMS}}\rho v_p^3 R}{I_p}\left(\frac{3Lf_s}{hc^3 - lc^3}\right)^{\frac{1}{2}}$$

This latter expression is used by inverter block 234 to calculate scalar moment profiles. Mean scalar moments are calculated for all solutions in the "constrained" solution subset.

Inverter block 234 then summarizes the results of the execution of steps 902–908 and saves the results (step 910). The sorted solution vector pairs characterizing the "constrained" solutions are summarized in matrix file 264. The columns of this matrix are the E, N, and Z components of the normal(s) to the failure planes, the E, N, and Z components of the corresponding slip vectors and the mean values of the scalar moment profiles and the failure modes. A value of 0 in the last column indicates an unknown failure mode. A value of 1 identifies a strike-slip failure mode. And a value of 2 identifies a normal faulting failure mode.

The corresponding orientation angles and related data are summarized in matrix file 266. The columns in this matrix are the bearing and dip angles of the failure plane normal and slip vector and are specified in degrees and the dilatancy ratio and amplitude ratio residual characterizing the solution. The matrices in matrix file 264 and matrix file 266 are saved on the secondary storage device.

A "quick look" summary is also created by inverter block 234. This summary presents the data summarized in two matrices and one vector contained in a solution means file 268. In solution means file 268, a mean vector is an (N×7) matrix, where N is the number of located events in the project data set. Data are entered in the V<N rows assigned to the processed event number, while the remaining rows are filled with zeros. The first column contains the processed event file number. The remaining 6 columns contain the E, N, and Z components of the mean failure plane normal and mean slip vectors.

The other of the two matrices in solution means file 268 is a mean angles matrix, which has a structure that is identical to the mean vectors matrix. It contains the processed event file number, the bearing and dip angles of the mean failure plane normal, the mean slip vector, the dispersion angles of the failure plane normals and slip vectors characterizing the "constrained" solution set for the processed event. The mean moment vector in the solution means file 268 contains the mean value of the scalar moment characterizing the processed event.

Then, inverter block 234 creates a plot data file 270 to store all the variables required to visually compare observed and theoretical data attribute profiles characterizing the processed event.

Therefore, methods and systems consistent with the present invention provide a determination of the orientation of natural fractures. Data attributes of recorded seismograms are extracted, and then these data attributes are inverted to yield reliable estimates of the components of the unit vectors that specify the orientations of the seismically perceptible set of natural fracture planes, which are activated by a hydraulic fracturing treatment. Further the methods and systems consistent with the present invention provide beneficial improvements over conventional approaches, in that: data attribute extraction is performed in the time domain; the order ambiguity problem is resolved; and microseismic scalar moments are estimated in the time domain.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method in a data processing system having a program for determining the orientation of a natural fracture in the Earth, the method comprising the steps of:

receiving, at a sensor in an observation well, a far-field point-source signal profile for a microseismic event;

extracting in the time-domain, a data attribute information from the far-field point-source signal profile for a microseismic event; and calculating in the time-domain, an estimate of the orientation of the natural fracture based on the extracted data attribute information.

2. The method according to claim 1, wherein the estimate of the orientation of the natural fracture is calculated using a constrained non-linear inversion.

3. The method according to claim 1, wherein the calculated estimate of the orientation of the natural fracture includes at least one of a failure mode, a failure plane orientation, and a scalar moment.

4. The method according to claim 1, further comprising the step of: receiving the far-field point-source signal profile.

5. The method according to claim 1, further comprising the step of: resolving an order ambiguity in the calculated estimate of the orientation of the natural fracture.

6. The method according to claim 1, wherein the data attribute information comprises at least two of a ratio of a shear wave vertical component amplitude to a compressive wave amplitude, a ratio of the shear wave vertical component amplitude to the shear wave horizontal component amplitude, a ratio of a shear wave vertical component sign to a shear wave horizontal component sign, and an estimated location of the source.

7. The method according to claim 1, wherein calculating the estimate of the orientation of the natural fractures comprises calculating theoretical amplitude ratios and a sign profile of the ratio of the shear wave vertical component to the shear wave horizontal component based on a location of the microseismic event and a location of a sensor for detecting the microseismic event.

8. A computer-readable medium containing instructions that cause a data processing system having a program to perform a method comprising the steps of:

generating a local microseismic event;

extracting in the time-domain, a data attribute information from a far-field point-source signal profile for the microseismic event; and calculating in the time-domain an estimate of the orientation of the natural fracture based on the extracted data attribute information.

9. The computer-readable medium according to claim 8, wherein the estimate of the orientation of the natural fracture is calculated using a constrained non-linear inversion.

10. The computer-readable medium according to claim 8, wherein the calculated estimate of the orientation of the natural fracture includes at least one of a failure mode, a failure plane orientation, and a scalar moment.

11. The computer-readable medium according to claim 8, further comprising the step of: receiving the far-field point-source signal profile.

12. The computer-readable medium according to claim 8, further comprising the step of: resolving an order ambiguity in the calculated estimate of the orientation of the natural fracture.

13. The computer-readable medium according to claim 8, wherein the data attribute information comprises at least two of a ratio of a shear wave vertical component amplitude to a compressive wave amplitude, a ratio of a shear wave horizontal component amplitude to the compressive wave amplitude, a ratio of a shear wave vertical component sign to a shear wave horizontal component sign, a ratio of the shear wave vertical component amplitude to the shear wave horizontal component amplitude, and an estimated location of the source.

14. The computer-readable medium according to claim 8, wherein calculating the estimate of the orientation of the natural fractures comprises calculating theoretical amplitude ratios and a sign profile of the ratio of the shear wave vertical component to the shear wave horizontal component based on a location of the microseismic event and a location of a sensor for detecting the microseismic event.

15. A data processing system comprising:

a memory comprising a program that extracts in the time-domain a data attribute information from a far-field point-source signal profile for a microseismic event, and calculates in the time-domain an estimate of the orientation of a single natural fracture based on the extracted data attribute information; and a processing unit that runs the program.

16. The data processing system according to claim 15, wherein the estimate of the orientation of the natural fracture is calculated using a constrained non-linear inversion.

17. The data processing system according to claim 15, wherein the calculated estimate of the orientation of the natural fracture includes at least one of a failure mode, a failure plane orientation, and a scalar moment.

18. The data processing system according to claim 15, wherein the program receives the far-field point-source signal profile.

19. The data processing system according to claim 15, wherein the program resolves an order ambiguity in the calculated estimate of the onentation of the natural fracture.

20. The data processing system according to claim 15, wherein the data attribute information comprises at least two of a ratio of a shear wave vertical component amplitude to a compressive wave amplitude, a ratio of a shear wave horizontal component amplitude to the compressive wave amplitude, a ratio of a shear wave vertical component sign to a shear wave horizontal component sign, a ratio of the shear wave vertical component amplitude to the shear wave horizontal component amplitude, and an estimated location of the source.

21. The data processing system according to claim 15 wherein calculating the estimate of the orientation of the natural fractures comprises calculating theoretical amplitude ratios and a sign profile of the ratio of the shear wave vertical component to the shear wave horizontal component based on a location of the microseismic event and a location of a sensor for detecting the microseismic event.

22. A data processing system comprising:

means for receiving, in an observation well, a far-field point-source signal profile for a microseismic event;

means for extracting in the time-domain a data attribute information from the far-field point-source signal profile for a microseismic event; and means for calculating in the time-domain an estimate of the orientation of the natural fracture based on the extracted data attribute information.

* * * * *

UNITED STATES PATENT AND TRADEMARK OFFICE

CERTIFICATE OF CORRECTION

PATENT NO. : 6,985,816 B2 
DATED : January 10, 2006
INVENTOR(S) : Sorrells et al.

It is certified that error appears in the above-identified patent and that said Letters Patent is hereby corrected as shown below:

Column 4,
Line 1, change "a low" to -- allow --.

Column 7,
Lines 42-52, the equations should read as follows:

-- $$S_x(k,n)=\left(\frac{1}{W}\sum_{m=k-\frac{W}{2}}^{k+\frac{W}{2}}\left(X(m,n)-\overline{X}_k(n)\right)^2\right)^{\frac{1}{2}} \qquad k=\frac{W}{2}+1\ldots\ldots\ldots\ldots M-W$$ --.

where $$\overline{X}_k(n)=\frac{1}{W+1}\sum_{m=k-\frac{W}{2}}^{m=k+\frac{W}{2}}X(m,n) \qquad k=\frac{W}{2}+1\ldots\ldots\ldots\ldots M-W$$

Column 12,
Line 27, insert a space before "if".

Signed and Sealed this

Sixth Day of June, 2006

JON W. DUDAS
*Director of the United States Patent and Trademark Office*